(12) United States Patent
Okajima et al.

(10) Patent No.: US 7,752,897 B2
(45) Date of Patent: Jul. 13, 2010

(54) MOLECULE MEASURING DEVICE AND MOLECULE MEASURING METHOD

(75) Inventors: Takaharu Okajima, Sapporo (JP); Hiroshi Tokumoto, Sapporo (JP)

(73) Assignee: National University Corporation Hokkaido University, Hokkaido (JP)

( * ) Notice: Subject to any disclaimer, the term of this patent is extended or adjusted under 35 U.S.C. 154(b) by 584 days.

(21) Appl. No.: 11/658,728

(22) PCT Filed: Jul. 8, 2005

(86) PCT No.: PCT/JP2005/012689

§ 371 (c)(1),
(2), (4) Date: Jan. 29, 2007

(87) PCT Pub. No.: WO2006/011348

PCT Pub. Date: Feb. 2, 2006

(65) Prior Publication Data

US 2008/0289404 A1    Nov. 27, 2008

(30) Foreign Application Priority Data

Jul. 30, 2004    (JP) ............... 2004-224573

(51) Int. Cl.
*G01B 5/28* (2006.01)
(52) U.S. Cl. ....................................... 73/105

(58) Field of Classification Search .......... 850/33; 73/104–105
See application file for complete search history.

(56) References Cited

U.S. PATENT DOCUMENTS

2003/0110844 A1*   6/2003   Struckmeier et al. .......... 73/105

FOREIGN PATENT DOCUMENTS

JP    2001-165840 A    6/2001

OTHER PUBLICATIONS

Binnig, G., et al., "Atomic Force Microscope," *Physical Review Letters*, vol. 56, No. 9, pp. 930-933, (1986).

(Continued)

*Primary Examiner*—Hezron Williams
*Assistant Examiner*—Nathaniel Kolb
(74) *Attorney, Agent, or Firm*—The Nath Law Group (57) ABSTRACT

A molecule measuring apparatus capable of controlling the drawing directions of molecules always in a uniaxial direction in a measurement performed by extending and retracting the molecules on a substrate. In the apparatus, a cantilever (200) lifts one end of a molecule (900) on the substrate (100), and a control section controls the peeling point of the molecules, which is a boundary between the portion of the molecule (900) in contact with the substrate (100) and the portion of the molecule (900) separated from the substrate (100) by the lifting, and the position of the cantilever (200) so that the peeling point and the position of the cantilever (200) are positioned vertical to the substrate (100).

13 Claims, 9 Drawing Sheets

OTHER PUBLICATIONS

Frisbie, C.D. et al., "Functional Group Imaging by Chemical Force Microscopy," *Science*, vol. 265 pp. 2071-2074, (1994).

Lee, G. U. et al., "Sensing Discrete Streptavidin-Biotin Interactions with Atomic Force Microscopy," *Langmuir*, vol. 10, pp. 354-357, (1994).

Mitsui, K., et al., "Mechanical unfolding of α2-macroglobulin molecules with atomic force microsope," *FEBS Letters*, vol. 385, pp. 29-33, (1996).

Rief, M. et al., "Reversible Unfolding of Individual Titin Immunoglobulin Domains by AFM," *Science*, vol. 276, pp. 1109-1112, (1997).

Nakamura et al., "Development of handling technology for biological molecule and cell using AFM", p. 283.

Takeda, Seiji et al., "Measurement of the Length of the α Helical Section of a Peptide Directly Using Atomic Force Microscopy", Chemical & Pharmaceutical Bulletin, 2001, pp. 1512-1516, vol. 49, No. 12, Pharmaceutical Society of Japan.

Ikai, Atsushi et al., "Mechanical Stretching and Rheological Study of Single Protein Molecules", Journal of Japanese Society of Tribologists, 2004, pp. 49-55, vol. 49, No. 1, Japanese Society of Tribologists.

Ikai, Atsushi, "Nanomechanics of Surface Immobilized Protein Molecules", Journal of the Surface Science Society of Japan, 2001, pp. 620-626, vol. 22, No. 9, Japan.

\* cited by examiner

MOLECULE MEASURING DEVICE AND MOLECULE MEASURING METHOD

TECHNICAL FIELD

The present invention relates to a molecule measuring apparatus and a molecule measuring method. More particularly, the present invention relates to molecule measurement using the atomic force microscope.

BACKGROUND ART

The atomic force microscope (hereinafter "AFM") developed in 1986 (see non-patent document 1), is the kind of microscope that enables high resolution observation of the surface structures of conductors, semiconductors and insulators (including polymers and biomaterials). By using the single-molecule measuring method (also called "force spectroscopy") of the AFM, the inter-molecular interaction (inter-molecular bonding strength) at single molecule levels (see non-Patent documents 2 and 3) and the intra-molecular interaction (conformation change of a single molecule) (see non-patent documents 4 and 5) can be examined.

Non-patent Document 1: G. Binnig, C. F. Quate, and Ch. Gerber, "Atomic Force Microscope", Phys. Rev. Lett. Vol. 56, 1986, p. 930.
Non-patent Document 2: Frisbie, C. D., Rozsnyai, L. F., Noy, A., Wrighton, M. S. and Lieber, C. M. "Functional Group Imaging by Chemical Force Microscopy", Science Vol. 265, 1994, p. 2071.
Non-patent Document 3: Lee, G. U., Kidwell, D. A. and Colton, R. J. "Sensing Discrete Streptavidin-Biotin Interactions with Atomic Force Microscopy", Langmuir Vol. 10, 1994, p. 354-357.
Non-Patent Document 4: K. Mitsui, M. Hara, A. Ikai, FEBS Lett. "Mechanical unfolding of alpha2-macroglobulin molecules with atomic force microscope", Vol. 385, 1996, p. 29.
Non-Patent Document 5: M. Rief, M. Gautel, F. Oesterhelt, J. M. Fernandez, H. E. Gaub, "Reversible Unfolding of Individual Titin Immunoglobulin Domains by AFM", Science Vol. 276, 1997, p. 1109.

DISCLOSURE OF INVENTION

Problems to be Solved by the Invention

The conventional single-molecule measuring method is the kind of technique of sandwiching a macromolecule between a probe and a substrate and extending the molecule in a single axis direction. The molecule is extended with respect to one direction of three axes (x, z and Y axes) of the fine motion displacement element of the apparatus (apparatus with the substrate, for example, an Atomic Force Microscope). To control such a single-axis direction with respect to the apparatus as the reference, for example, the control method of extending the molecule by fixing velocity of the single-axis motion or the force acting in the single-axis direction. However, there are few methods for controlling the extending direction of the molecule using a plurality of axes.

It is considered that technology of freely translating and rotating a single chain molecule on the substrate can be utilized in various bottom-up nanotechnologies, including molecular wiring in future molecular electronics (whereby every molecule is regarded as an electronic element). However, the operation technology capable of freely translating and rotating a single chain molecule on the substrate is not yet established. For example, DNA (deoxyribonucleic acid) is the substance which is expected as a molecular thin wire, and many experiments for controlling the DNA structure have been reported up to the present. However, there is no method of moving a single molecule to arbitrary spatial positions in the room temperature or in solution and deforming the single molecule into arbitrary structures.

The conventional single-molecule measuring method is therefore not an accurate extending technology in a single-axis direction. Furthermore, since the position drift is inevitable with the atomic force microscope, it is difficult to extend a single molecule continuously in a long time. Furthermore, with the conventional single-molecule measuring method, how the molecule peels off the substrate (the point where the molecule peels off the substrate) or the shape of the molecule on the substrate, cannot be measured.

It is therefore an object of the present invention to provide a molecule measuring apparatus and a molecule measuring method for measuring a molecule by controlling the extending direction of the molecule in a single axis direction.

Means for Solving the Problem

The molecule measuring apparatus of the present invention may employ a configuration having: a lifting section that lifts an edge of a molecule existing on a substrate; and a control section that controls a peeling point of the molecule and a position of a lifting section to be on a vertical line with respect to the substrate, the peeling point being a boundary between a part where the molecule contacts with the substrate and a part where the molecule is detached from the substrate by means of the lifting section.

ADVANTAGEOUS EFFECT OF THE INVENTION

According to the present invention, a molecule can be measured by controlling the extending direction of the molecule in a single axis direction. Especially, in measurement whereby a molecule on the substrate is extended or contracted, the extending direction of the molecule peeling off the substrate can be controlled by using the three-axis fine motion systems mutually vertically crossing.

BEST MODE FOR CARRYING OUT THE INVENTION

Embodiments of the present invention will be explained below in detail with reference to the accompanying drawings. First, terms used in this description will be explained.

"Lifting section" is a means for lifting an edge of a molecule on the substrate. As the lifting section, there is a means which is used in a measuring method of deforming the molecule, for example, a cantilever, a glass needle, an light radiation pressure (optical pipette) and the like. The glass needle is a glass stick having the tip thereof processed into a thin, needle shape. In this description, a cantilever will be explained as an example of a lifting section. However, things other than the cantilever are by no means excluded. The lifting section has a tip (tip portion, for example, the probe of the cantilever) for lifting an edge of a molecule.

"Cantilever" has a probe with a sharp tip attached to an edge (edge portion) of a soft lever. The cantilever lifts a sample from the substrate by the tip of the probe. In this description, when the cantilever is mentioned, it includes the probe, unless otherwise specified. However, when the function of the probe needs to be clarified, the probe will be specifically mentioned (for example, the probe of the cantilever).

"Amount of deflection" is correspondent to the force working on the lifting section in the vertical direction (z-axis) with respect to the apparatus, and is measured by the apparatus. The apparatus here is a molecule measuring apparatus which controls the lifting section. For example, in case of the cantilever, the apparatus is an atomic force microscope. Note that, in this description, explanations will be given on the assumption that the plane of the apparatus (the plane formed by the x and y axes controlled by the apparatus) is parallel to the plane of the substrate where the sample exists (the plane formed by the x and y axes of the substrate). Actually, although there are cases where the plane of the apparatus is not parallel to the plane of the substrate, the error caused by this situation can be usually ignored. Furthermore, with the optical tweezers method, a particle adhered to a molecule (for example, latex) is trapped by means of light. The gap of the displacement of the trapped particle corresponds to the amount of deflection.

"Molecule" in this description is the target substance (sample) of measurement. As the molecule, a polymer (chain macromolecule) is supposed. The molecule is the kind of molecule where the force in the vertical direction monotonously increases with increasing the distance of the same radius direction from the center of the peeling point, r. For example, the target sample is the molecule, which behaves as a worm-like chain (WLC) (described later).

"Peeling point" is the boundary between the part where the molecule contacts with the substrate and the part where the molecule is detached from the substrate by being lifted. Above mentioned "by being lifted" means that the molecule is lifted by being extended, or that the molecule is lifted by means of a lifting section.

The space where the molecule is operated is represented by the coordinate space specified by three axes, that is, by the x, y and z axes. It is a premise that the coordinate space is determined by the molecule measuring apparatus. It is also a premise that the x and y axes form the plane of the apparatus or the substrate and the z-axis is vertical to the plane of the substrate.

The atomic force microscope and the AFM will be used synonymously. The atomic force microscope is an example of molecule measuring apparatus.

"Single-axis extension" means that, when the molecule measuring apparatus (for example, the probe of the cantilever of the atomic force microscope) or the experimenter pulls a certain substance (sample), the direction of the pull (extended direction) and the direction in which the substance is deformed, (displacement vector) are always on the same axis. It also means that, in extension measurement, the vector connecting one edge fixed by the probe and the peeling point fixed on the substrate is always on the same axis (parallel to the z-axis).

"Non-single-axis extension" means a state where single-axis extension does not apply.

"Elasticity measurement" means examination of the relationship between tension working on a certain substance (sample) and its displacement. In the single-axis extension of the molecule, the distance between both ends of the molecule moved by the apparatus or the experimenter corresponds to the distance between both ends of the molecule. Therefore, elasticity of the molecule can be accurately measured from the measurement the force and the displacement of the molecule measuring apparatus). However, unless single-axis extension is not used, the displacement of the molecule measuring apparatus controlled by the experimenter does not correspond to the displacement of the molecule, and so the elasticity can not be accurately evaluated. However, the evaluation is possible if the shape of the extended molecule is known. In addition, if single-axis extension is not achieved, the measured force does not match the tension working on the molecule.

The measurable quantities in the case of single molecule measurement are "the displacement of the molecule measuring apparatus (for example, the atomic force microscope)" and "the force in the vertical direction with respect to the substrate." "The displacement of the molecule measuring apparatus" is the distance between the substrate and the tip of the lifting section, and "the force in the vertical direction with respect to the substrate" is correspondent to the amount of deflection of the lifting section. Since "the displacement of the molecule measuring apparatus" is the displacement of the apparatus, the single-axis extending measurement is preferable in order to conform the displacement of the molecule measuring apparatus to the displacement of the molecule.

When it is mentioned that "the lifting section (the position of the lifting section) is controlled (moved)", it means: (1) the lifting section itself is moved; (2) the lifting section is fixed and the apparatus (a scanner equipped with the substrate) itself is moved, thereby moving the molecule on the substrate and controlling the positional relationship between the lifting section and the molecule; and (3) both the lifting section and the apparatus are moved. According to the above (1) to (3), the positional relationship between the lifting section and the molecule (the peeling point) is controlled to assure single-axis extension. To be more specific, control is implemented such that the positional relationship between the lifting section and the molecule (the peeling point) is vertical with respect to the substrate.

Embodiments

Figure 1:
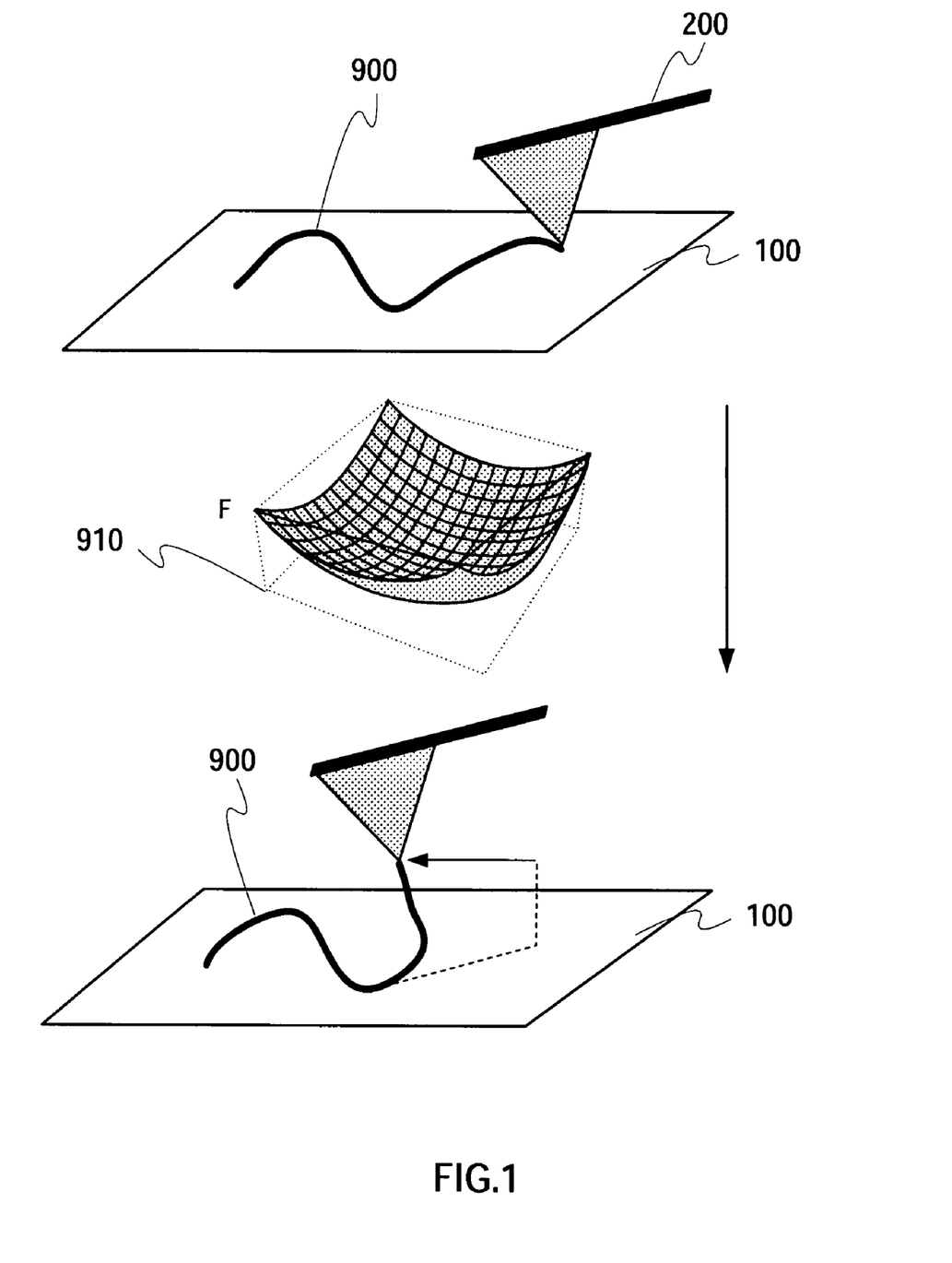
FIG. 1 shows an example of an operation of extending a molecule according to an embodiment of the present invention.

FIG. 1 shows an example of operation of extending a molecule by the single-axis extension in an embodiment of the present invention. In the present embodiment, explanation will be given using anatomic force microscope as an example of a molecule measuring apparatus. As shown in an upper part in FIG. 1, first, an edge of a random molecule (chain macromolecule) 900 existing on substrate 100 is pinched and lifted by cantilever 200 by physisorption (physical adsorption), covalent bond and so on. Next, as shown in lower part in FIG. 1, the position where molecule 900 peels off substrate 100 (the peeling point) and the position of the probe of cantilever 200 (that is, the relative positions of the peeling point and the probe) are controlled so that the force working on cantilever 200 in the vertical direction (z-axis direction) with respect to the plane of substrate 100, (an x-y plane) decreases.

With this control, cantilever 200 in the state of lifting an edge of molecule 900 and the peeling point where molecule 900 is detached from substrate 100 are on a vertical line with respect to substrate 100, and the positions of cantilever 200 and the peeling point are controlled while keeping the distance between cantilever 200 and substrate 100 (the shortest distance parallel with respect to the z-axis, corresponding to the length of the straight line connecting cantilever 200 and the peeling point) constant. The probe moves on the plane parallel to substrate 100, which crosses the point of coordinates of the z-axis when molecule 900 is lifted, and searches the point where the amount of deflection is minimum. Schematic diagram 910 shows an example of a schematic diagram of contour lines representing the magnitude of force in the vertical direction (z-axis direction) when cantilever 200, extending molecule 900, is moved within the plane (an x-y plane). The minimum point in schematic diagram 910 corresponds to the peeling point of the molecule.

Figure 2:
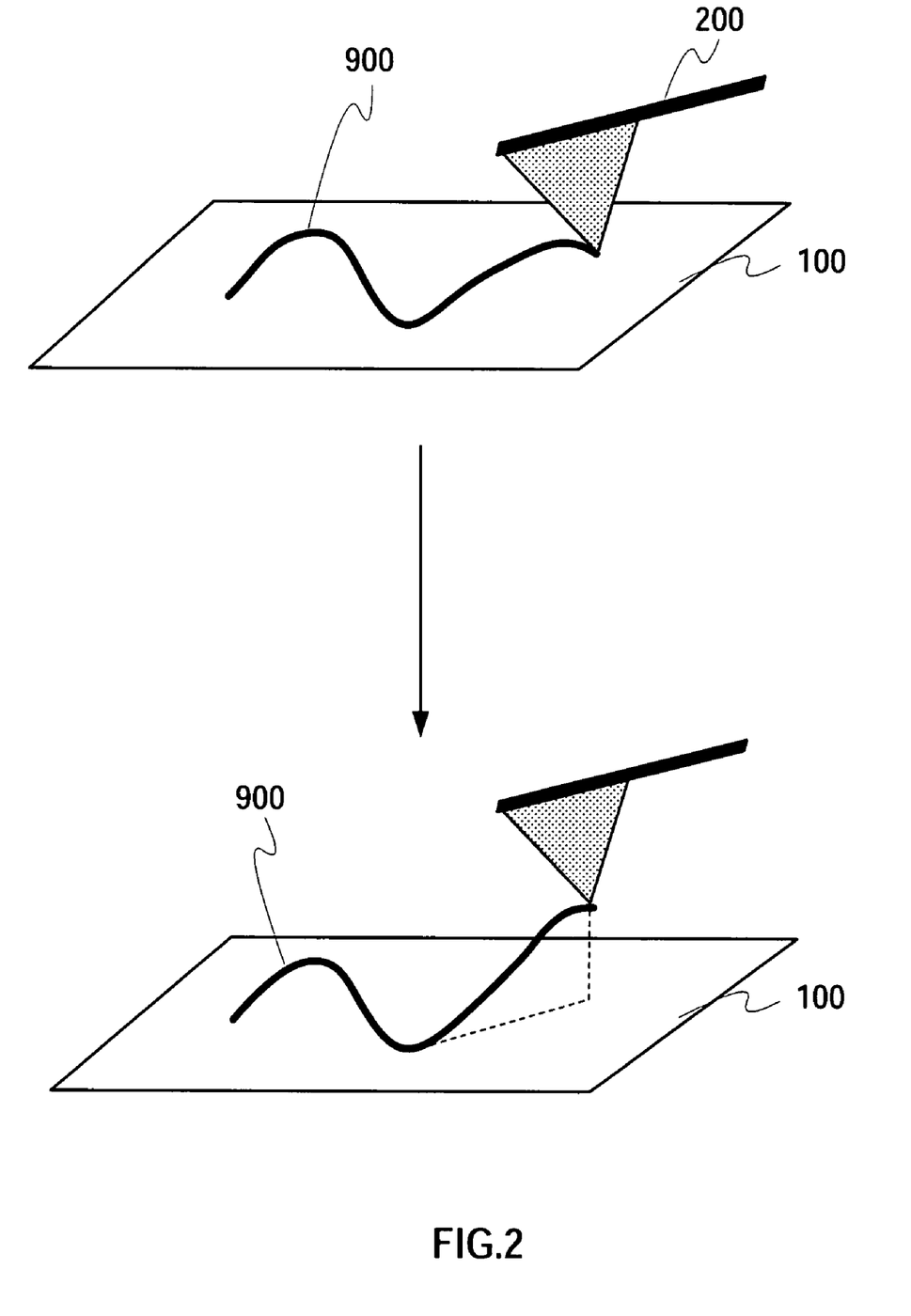
FIG. 2 shows an example of operation of extending a molecule by non-single-axis extension.

FIG. 2 shows an example of an operation of extending the molecule by non-single-axis extension. In FIG. 2, when molecule 900 is pulled, the direction of the pull (extended direction) and the direction in which the substance is deformed (displacement vector) are not on the same axis.

Next, the problems in a case that the molecule is extended using the atomic force microscope (AFM) will be explained. The AFM is equipped with a scanner of three axes by the x, y and z axes, which enables spatial position control in the precision of nanometers. Since the spatial coordinates (x, y and z axes) are determined by the AFM, it can be stated that the apparatus (AFM itself) is the reference position. In case of extending a molecule, for example, substrate 100 is placed on the x-y plane and the distance between the probe and substrate 100 is changed. The molecule moves on a single axis (z-axis), and so it can be stated that "the molecule is extended in a single axis direction with respect to the apparatus as the reference position." This situation does not pose any problems in the elasticity measurement of bulk-surface (substance uniformly dispersed on a surface). However, as shown in FIGS. 1 and 2, when the chain macromolecule existing on the surface is regarded as the reference, it cannot be stated that single-axis extension is carried out.

Accurate single axis extension means that the molecule is extended always parallel to the extending axis (z-axis) and vertical with respect to the x-y plane. That is, in the conventional single molecule extending method, since cantilever 200 moves on a single axis (the cantilever moves in the vertical direction from the point where the molecule begins peeling off) as shown in FIG. 2, the molecule is not extended by single axis extension.

Next, single axis extension will be explained using a sample schematically representing a chain molecule. FIG. 3 schematically shows an example of operation flow of single axis extension. In FIG. 3, a substance connecting four springs having a length of b, is supposed. Note that the series spring shown in FIG. 3 is an imaginary substance. It is expected that the molecule actually peels off in consecutive units (although discontinuous in atomic levels), and the model shown in FIG. 3 is different from the actual chain molecule.

Figure 3A:
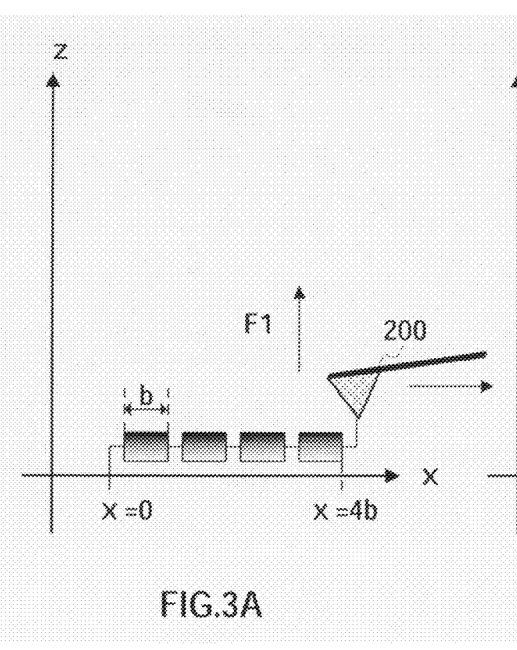
FIG. 3 is schematic view of an example of an operation flow of single-axis extension.
Figure 3B:
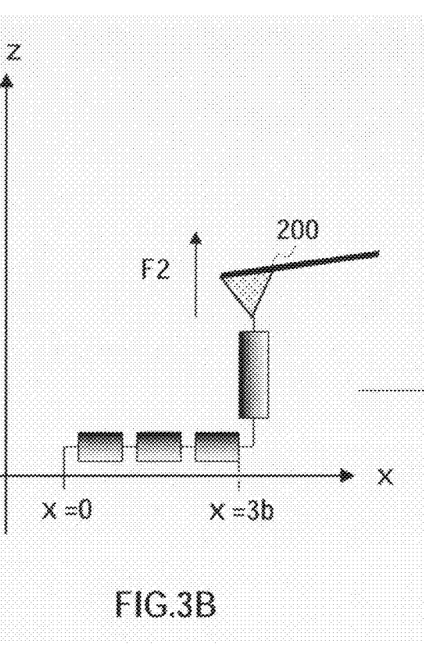
Figure 3C:
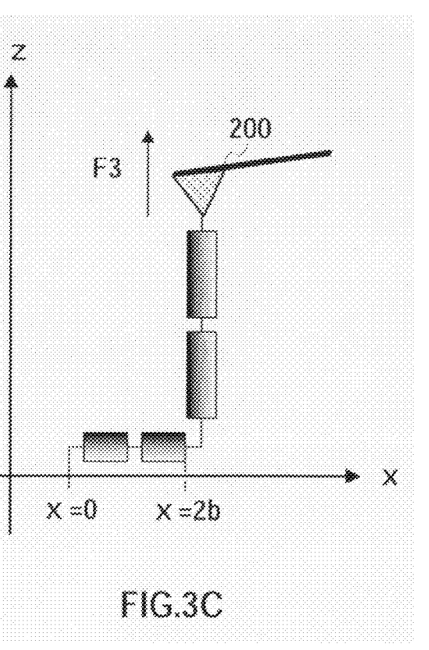

The x-axis, which corresponds to one direction on substrate 100, forms the plane of substrate 100 together with the y-axis. The x-axis indicates the distance from an edge (x=0) of the substance. The z-axis is vertical with respect to substrate 100 and is the same direction as the extending direction. As shown in FIG. 3A, when the other edge of the springs is at the position of x=4b and the force in the z-axis direction increases from zero to reach F1, it is assumed that the rightmost spring in the sequence peels. The other edge of the springs (the peeling point) moves to the position of x=3b, and, in order to carry out single axis extension with the peeling spring, the position of the pull needs to move from x=4b to x=3b (peeling point) (FIG. 3B). Similarly, when the force further increases to reach F2, it is assumed that another spring peels (FIG. 3C). In this case, since the peeling point moved from x=3b to X=2b, the position of the probe of cantilever 200 moves likewise.

In this manner, the string-like molecule (peeling part) can be extended in a single axis direction by changing the extension position of the probe of cantilever 200 on the x-y plane (on substrate 100). The track of the movement of the probe of cantilever 200 matches the adsorbing shape of molecule 900 by moving the position of the probe of cantilever 200 to the peeling point. Therefore, the measurement of the molecule can be performed without imaging the shape of molecule 900. In FIG. 3, although an explanation was given using a model of a plurality of springs, the present invention is by no means limited to the substance where individual springs are discrete of one another as shown in FIG. 3, and continuous substance and substance that cannot be divided into individual parts (hard to divide) are by no means excluded. When the probe of cantilever 200 lifts an edge of molecule 900, and if this is likely to result in a situation where a point (peeling point) of molecule 900 contacts with substrate 100, the technique shown in FIG. 3 can be applied.

Next, how the probe of cantilever 200 lifting an edge of a molecule is moved to the peeling point will be explained.

Figure 4:
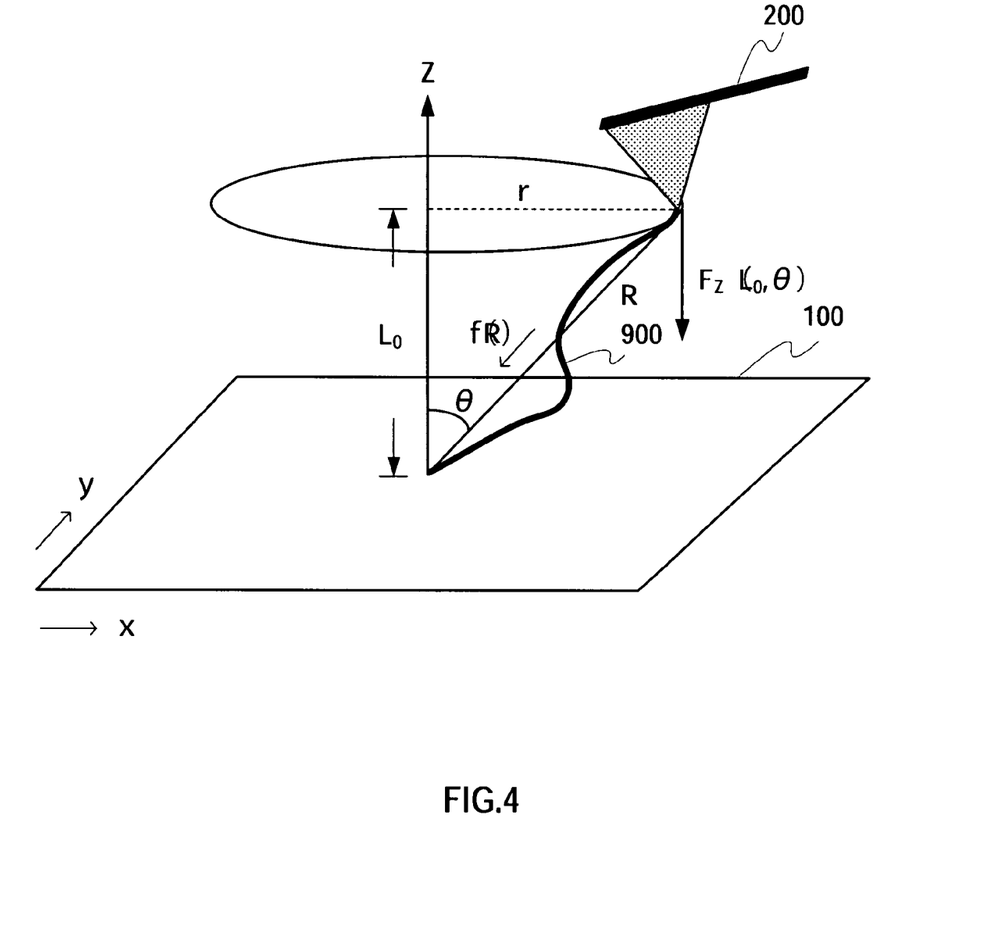
FIG. 4 shows an example of the relationship between tension of the molecule and the extended length of the molecule.

It is well known that the behavior of tension in most polymers is extremely similar to the worm-like chain (WLC) model (hereinafter, "WLC model"). With respect to molecule 900, when the force in the vertical (z-axis) direction is $F_z$ and the distance of the same radius direction, where the peeling point is the center, is r, a molecule fulfilling the condition $\partial F_z/\partial r > 0$ is the target, and the WLC model is an example of the molecule. FIG. 4 shows an example of the relationship between the tension of molecule 900 and the extended length. L (not shown) is the full length of molecule 900, $L_0$ is the distance between the tip of the probe and substrate 100, R is the straight distance between an edge of molecule 900 and the peeling point, and θ is the angle formed by the z-axis and the probe of cantilever 200. $F_z$ is the force working on cantilever 200 (corresponding to the amount of deflection: the force working in the vertical direction with respect to substrate 100). As shown in FIG. 4, a condition is considered that an edge of chain molecule 900 having a full length of L, is pulled by angle θ up to the position of the height $L_0$ from substrate 100 by using the probe of cantilever 200 and the peeling point contacts with substrate 100. f(R) working on the peeling point from the probe, is the tension working on the probe. In FIG. 4, the force f(R) is illustrated at a position away from the probe because of the limited blank space in the drawing. The tension f(R) in the WLC model is given by (Equation 1).

$$f(R) = \frac{K_B T}{\xi}\left[\frac{1}{4}\left(1-\frac{R}{L}\right)^{-2} - \frac{1}{4} + \frac{R}{L}\right] \quad \text{[Equation 1]}$$

$k_B$ is the Boltzmann constant, T is the temperature, and ξ is the Kuhn length. Therefore, the force $F_z(L_0, \theta)$ (observable force) working on cantilever 200 in the vertical direction is given by (Equation 2).

$$F_z(L_0, \theta) = f(L_0/\cos\theta)\cos\theta \quad \text{[Equation 2]}$$

Figure 5:
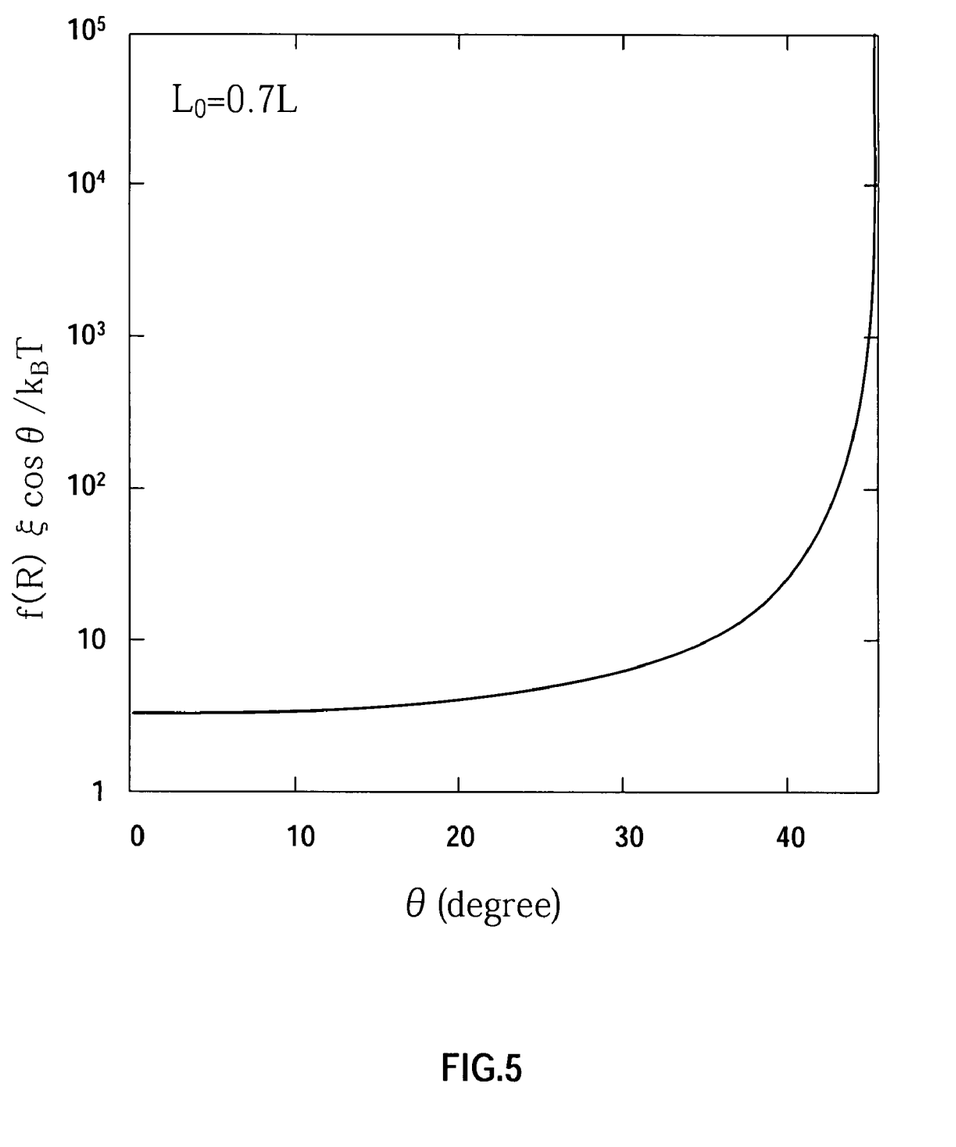
FIG. 5 shows change in $F_z$ with respect to $\theta$ at $L_0=0.7$ L.
Figure 6:
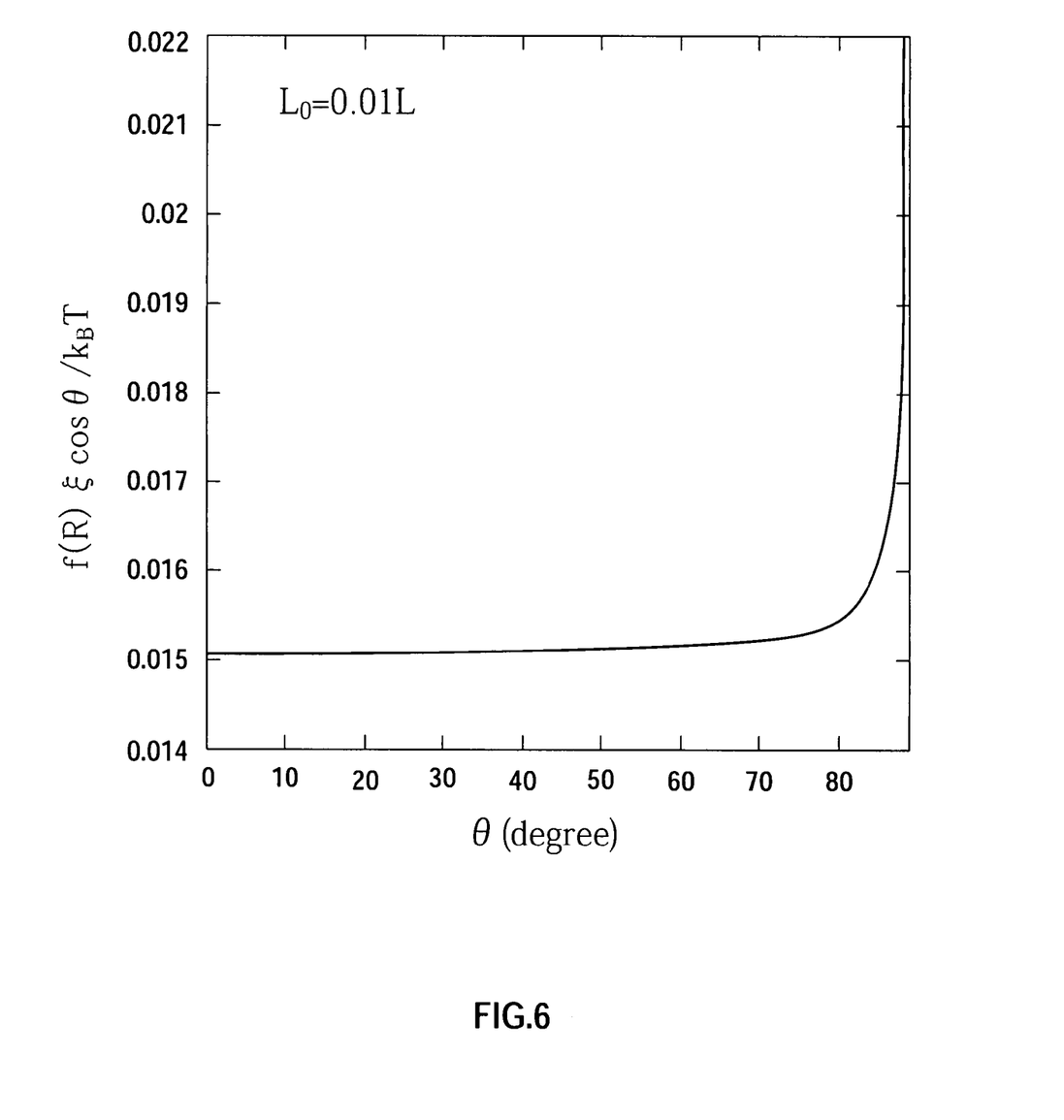
FIG. 6 shows change in $F_z$ with respect to $\theta$ at $L_0=0.01$ L.

FIGS. 5 and 6 show examples of change of $F_z$ with respect to θ at different $L_0$'s. The vertical axis is $f(R)\xi \cos \theta / K_B T$, and $f(R)\cos \theta$ is the force working in the z-axis direction. The vertical axis is standardized as $F_z(\xi/K_B T)$. Here, $\xi/K_B T$ may be considered a constant. FIG. 5 shows a case of $L_0$=0.7 L as an example, and FIG. 6 shows a case of $L_0$=0.01 L as an example. As shown in FIG. 5, in case of large extension (extended by 70% of the full length $L_0$ in the vertical direction), if the angle of inclination increases, the force in the vertical direction monotonously increases. In addition, as shown in FIG. 6, in case of small extension (extended by 1% of the full length $L_0$ in the vertical direction), $F_z$ is a monotonous increasing function of θ.

According to the above results, with molecules (not limited to molecules, and substance that can be sample is also possible) that can be represented by the WLC model, by controlling and minimizing the force in the vertical direction, it is possible to determine the peeling point from the position of the probe of cantilever 200. With random polymers (polymers of the WLC model), whether molecule 900 is inclined can be judged by measuring the force in the z-axis direction. Control of making the straight line connecting the peeling point of molecule 900 and the point (position) extended by the probe of cantilever 200 vertical with respect to substrate 100 uses the force (corresponding to the amount of deflection of the cantilever) working in the z-axis direction of the molecule measuring apparatus.

Next, how the probe of cantilever 200 is controlled (moved) in the molecule measuring apparatus, will be explained.

Figure 7:
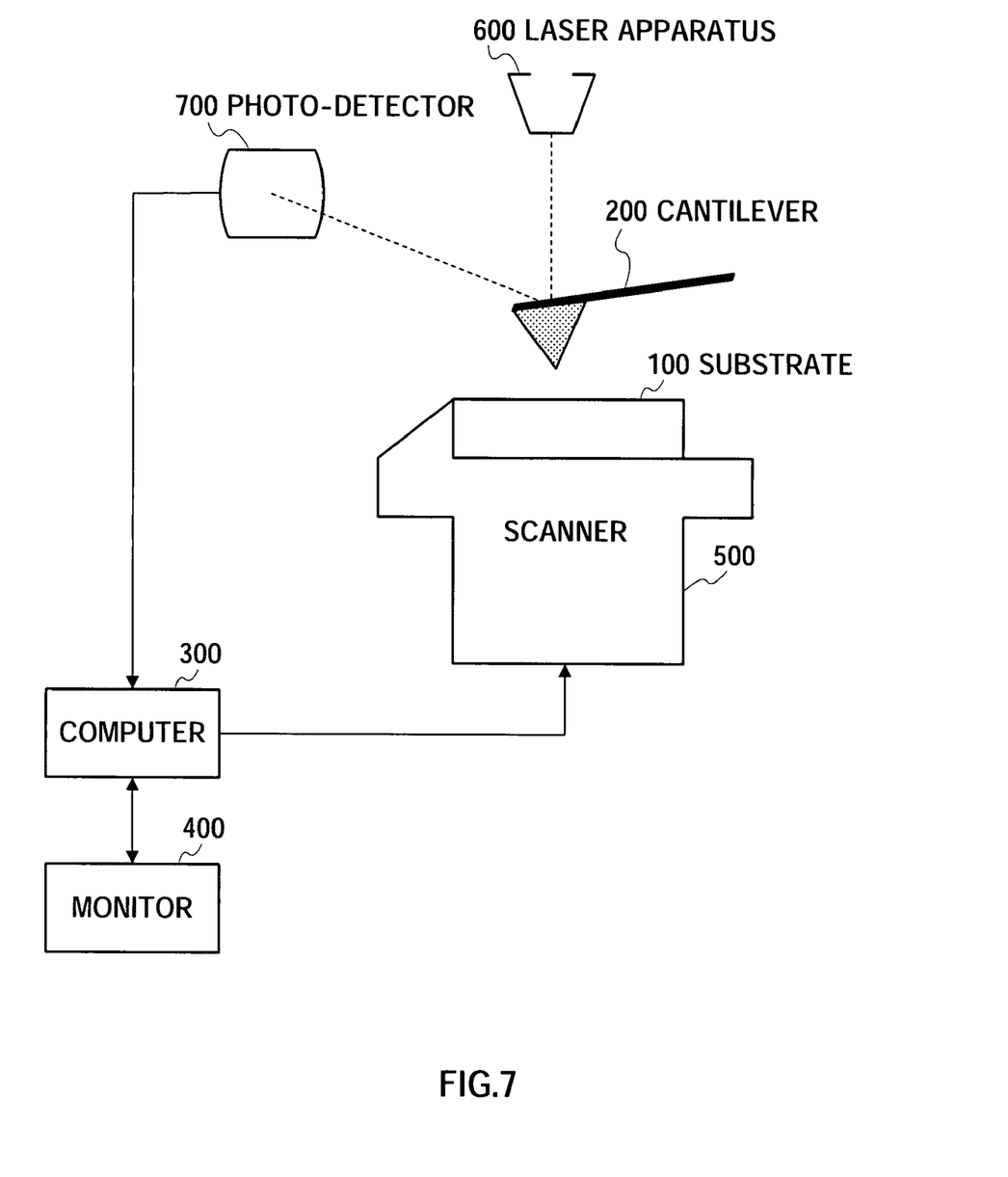
FIG. 7 shows an example of the configuration of the molecule measuring apparatus.

First, the configuration of the molecule measuring apparatus will be explained. FIG. 7 shows an example of the configuration of the molecule measuring apparatus. As the molecule measuring apparatus shown in FIG. 7, an atomic force microscope is supposed.

On substrate 100, a sample is placed. The sample may be placed in a solvent as well. Substrate 100 is a plane defined by the x and y axes.

The probe of cantilever 200 lifts the sample. Cantilever 200 has a probe with a sharp tip, and the tip portion of the probe becomes the contact point with an edge of the sample. In FIG. 7, an example in which cantilever 200 is fixed is shown.

Computer 300, which controls scanner 500 and inputs information measured by photo-detector 700, reads the amount of deflection from the inputted information and sends feedback to scanner 500 based on the amount of deflection.

Monitor 400 displays data transmitted from computer 300 in graphical representation.

Substrate 100 is provided in scanner 500. Scanner 500 moves substrate 100 in the x, y and z axis directions. Scanner 500 is controlled by computer 300 and moves substrate 100.

Laser apparatus 600 irradiates a laser light to cantilever 200. Photo-detector 700 receives the laser light reflected from the back of cantilever 200 and outputs information obtained from the received laser light to computer 300. In FIG. 7, the laser light is illustrated by dotted lines.

Figure 8:
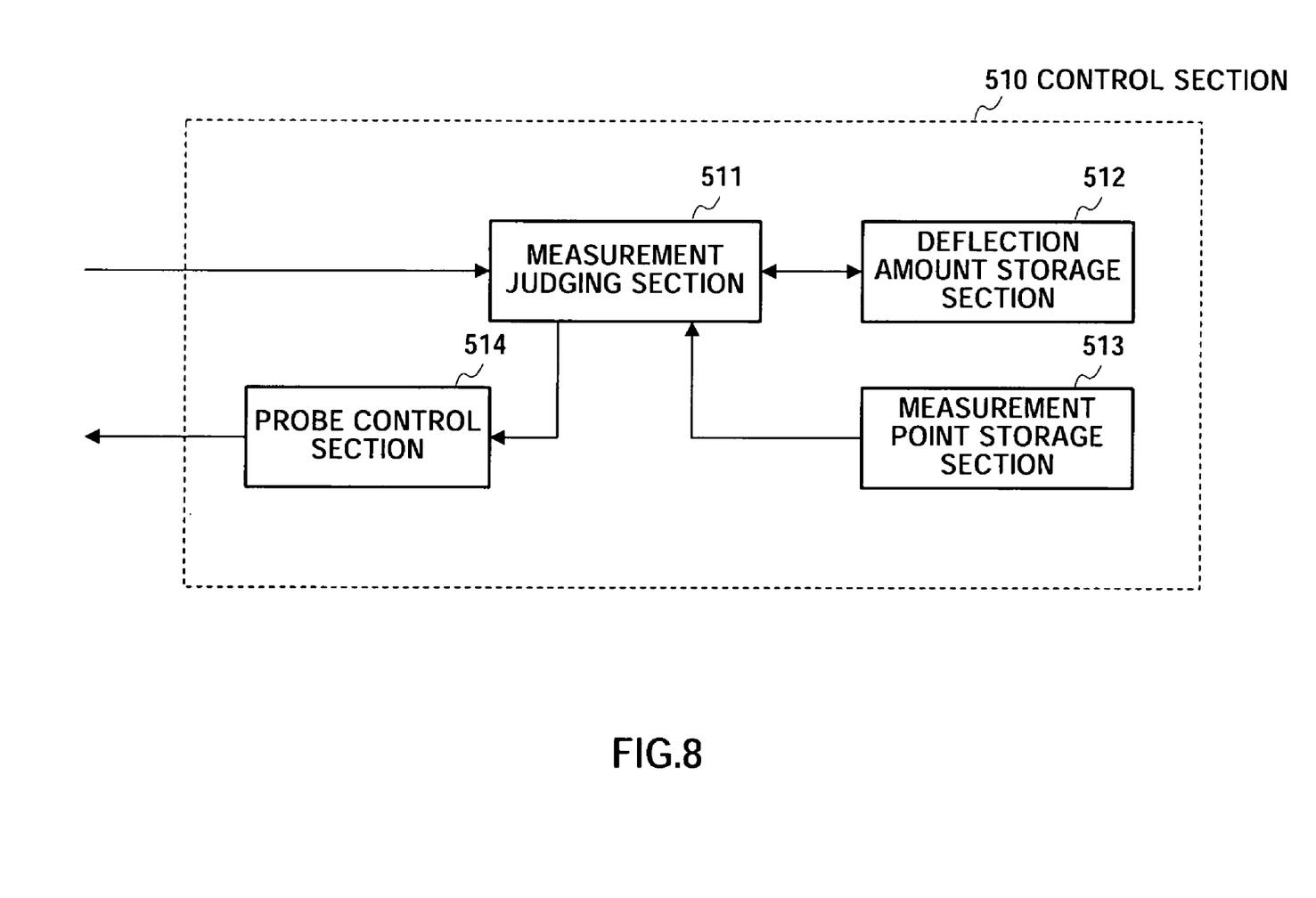
FIG. 8 shows an example of the configuration of a control section.

Next, an example of a control section (control apparatus or control means) that controls the relative positions of the probe of cantilever 200 and substrate 100, will be explained. FIG. 8 shows an example of the configuration of control section 510. Here, a case will be described as an example where control section 510 is software operating on computer 300. Control section 510 includes measurement judging section 511, deflection amount storage section 512, measurement point storage section 513 and probe control section 514.

Measurement judging section 511 obtains the amount of deflection of cantilever 200 read from information measured by photo-detector 700, compares the obtained amount of deflection with the amount of deflection which measured earlier, detects the minimum value and judges whether or not to move the probe and measure the amount of deflection.

Deflection amount storage section 512 stores the measured amount of deflection and position information where the amount of deflection is measured. With respect to the measured amount of deflection, the amount of deflection of a predetermined number of amounts of deflection—for example, a number of amounts of deflection within a predetermined range used for extracting a minimum value—are stored. The position information is information that specifies the position of the probe when the amount of deflection was measured.

The measurement point storage section 513 moves the probe from a given point to the measurement point (measurement range, information for specifying a relative position from a certain position) and stores the measurement point. The user of the molecule measuring apparatus stores the measurement point in measurement point storage section 513 in advance. For example, a plurality of measurement points used in measuring the amount of deflection by moving the probe from a certain position are stored. It is expected that the measurement points exist within a predetermined circle or rectangle. Probe control section 514 instructs scanner 500 to move cantilever 200 and controls the position of the probe.

Figure 9:
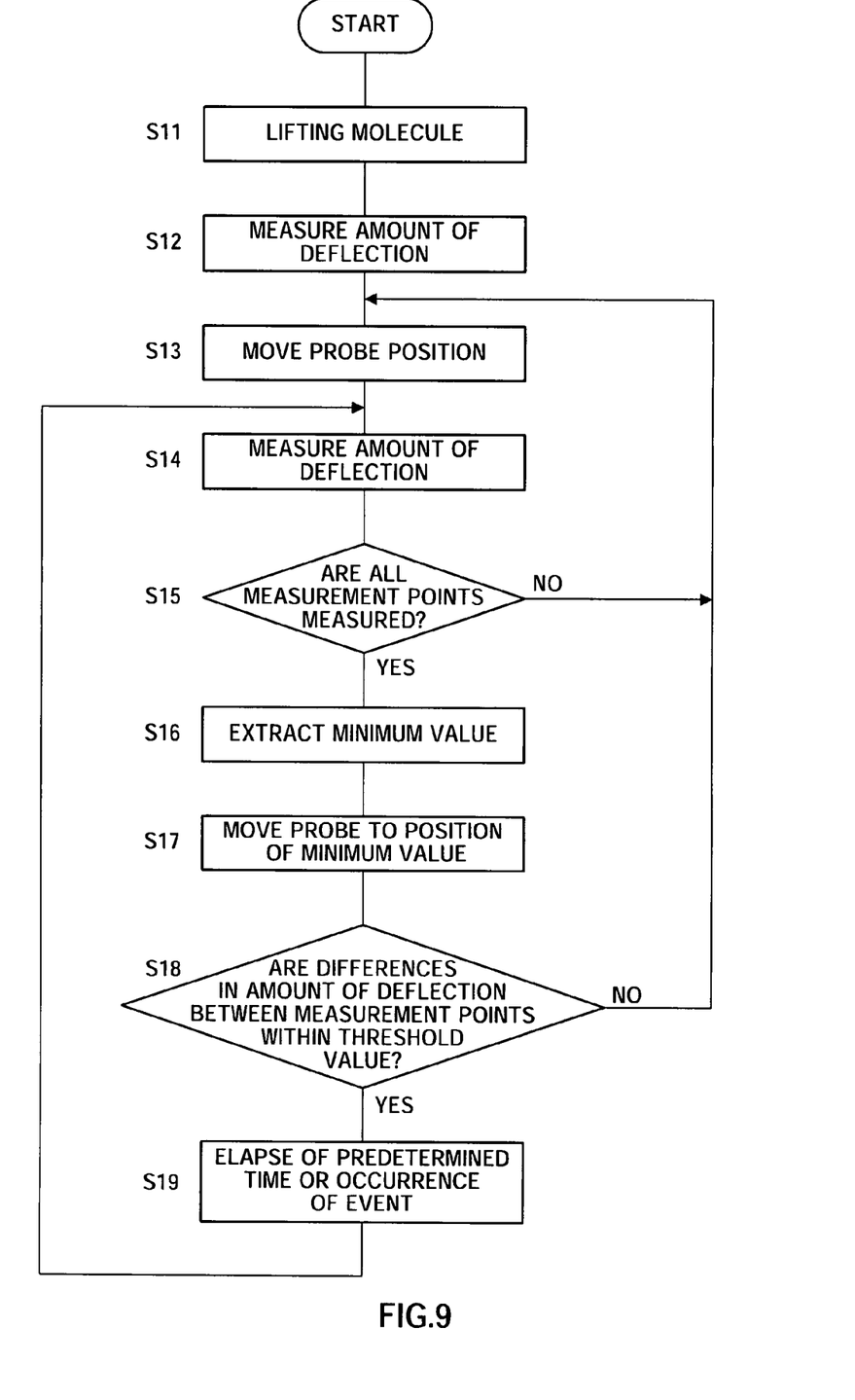
FIG. 9 is a flowchart showing an example of operation of molecule measurement.

Next, the operation of measuring the molecule will be explained with reference to FIG. 9. FIG. 9 is a flowchart showing an example of an operation of measuring the molecule. In FIG. 9, an operation of control section 510 will be mainly explained.

First, the probe of cantilever 200 adsorbs (or combines) molecule 900 arranged on substrate 100 and lifts the molecule from substrate 100 (step S11). The upper parts in FIGS. 1 and 2 indicate the stage where the probe adsorbs molecule 900, and the lower part in FIG. 2 indicates the stage where molecule 900 is lifted from substrate 100. The molecule measuring apparatus measures the amount of deflection of cantilever 200. In this stage in measurement, since the load (initial load) generated in the adsorption of the probe with substrate 100 is reflected in the amount of deflection, the amount of deflection after exceeding a predetermined extension length is regarded as the measurement value. The measured amount of deflection is inputted to measurement judging section 511 of control section 510 together with the measured position information (step S12).

Measurement judging section 511 stores the amount of deflection and the position information into deflection amount storage section 512. Next, measurement judging section 511 outputs an instruction for moving the probe to the measurement point stored in the measurement point storage section 513 to probe control section 514, which controls scanner 500 based on the above instruction (step S13). Although a plurality of measurement points are stored in measurement point storage section 513, in what order these points are moved is determined in advance.

Next, measurement judging section 511 obtains the amount of deflection after moving the probe and then stores that amount of deflection into deflection amount storage section 512 (step S14). Measurement judging section 511 judges whether the amount of deflection is measured for the above plurality of measurement points (step S15). If all the measurement points have not been measured (NO in step S15), the processes from the step S13 will be repeated. If all the measurement points have been measured (YES in step S15), measurement judging section 511 extracts the minimum value from the measured amounts of deflection (step S16) and moves the probe to the position of the minimum value, through probe control section 514 (step S17). Measurement judging section 511 judges whether the amount of deflection for each measurement point is within a predetermined range (step S18). The predetermined range is held in measurement judging section 511. When the amount of deflection is not within a predetermined range ("NO" in step S18), the processes from the step S13 will be repeated. When the amount of deflection is within a predetermined range ("YES" in step S18), a waiting state will continue after a predetermined time passes or until an event occurs (step S19). The result upon arriving at S19 is shown in the illustration in lower part of FIG. 1.

In S19, the influence of the drift that occurs in the molecule measuring apparatus is periodically eliminated, or the influence to the molecule measuring apparatus by the occurrence of an event (for example, a case that a shock is given) is eliminated. Also, it is possible to make the predetermined time very short and control the position of the probe constantly. Furthermore, it is equally possible to remove the process of S19. Note that a case that molecule 900 partially peels off substrate 100 as a result of extending cantilever 200 by single-axis extension is also included in the occurrence of an event. In this case, since the probe is moved to the position where the molecule peels, the processes from S14 are executed. In this manner, by repeating the operation of moving the probe to a position where molecule 900 peels and then executing single-axis extension of the molecule, the track of the movement shows the shape the molecule.

If the flow of operations in FIG. 9 is the movement of the probe, the state of upper part in FIG. 1 or FIG. 2 shifts to the state of lower part of FIG. 2 and further shifts to the state of lower part in FIG. 1. If the operations of FIG. 9 are associated with FIG. 3, FIG. 3A is a pre-stage of S11 shown in FIG. 9 and is a state where the probe adsorbs molecule 900, and the probe is at the position of x=4b. FIG. 3B is a state where the processes from S11 to S18 have been executed and the probe has been moved to the point of X=3b where molecule 900 peeled. FIG. 3C corresponds to a state where molecule 900 has further peeled as a result of performing single-axis extension with respect to the x=3b reference, and where the processes from S14 to S18 have been executed and the probe has been moved to the position of x=2b. In the processes from S14 to S18, it is preferable to move cantilever 200 on the plane of radius r which vertically crosses with the z-axis, as shown in FIG. 4. Therefore, after the probe is once moved to a specific coordinate point of the z-axis, the coordinates on the x and y axes are changed to detect a position where the amount of deflection is smaller, without changing the z-axis coordinate.

In this manner, the minimum value of the amount of deflection of cantilever 200 is detected, and the probe can be moved to the point where molecule 900 peels off substrate 100. As a result, a method and apparatus can be provided whereby single-axis extension of a substance can be performed and the shape of the substance can be learned by utilizing the force in the z-axis direction, without observing the shape of a string-like (chain-like) substance.

In addition, the following improvements can be anticipated from the high-accuracy molecule measuring apparatus and method of the present invention.

First, since the single-axis extension of a molecule can be performed at all times for the substrate and the probe, the accuracy of the measurement of the single molecule measuring method improves (improvement in accuracy of the single molecule measuring method).

Next, since the position of the probe always matches the point where the molecule starts peeling off the substrate (initially, it is the point where the probe contacts with the substrate), the shape of the molecule before peeling from the position of the probe, the length of the peeled molecule (if the mass of the molecule is known, the length or weight of the unpeeled part) can be known, and the adsorption force or changes in adsorption/removability over time can be known from the movement of the initial point (acquisition of position information necessary in molecule operations). These molecular spatial information, which become basic information in the translation/rotation operation of the molecule, can be utilized in manufacturing molecular wires.

Further, mechanical drift exists in the AFM apparatus, and the positions of the cantilever side and the substrate side steadily change. Therefore, in an ordinary single-molecule measuring method, it was practically impossible to measure a single molecule for a long time. However, according to the present invention makes it possible to check the position of a molecule, so that, in accordance with drift, the position of the problem can be changed, thereby solving the above problem of the past (elimination of influence by the drift in the apparatus). And, drift components and molecule-related components can be separated from measurement values, the reliability of the measurement value improves. Further, accurate measurement of drift becomes possible.

Although an atomic force microscope has been used in the above explanation as an example of a molecule measuring apparatus, this is by no means limiting. The measurement of molecules becomes possible by means of configurations where: (1) a lever (the lever itself is made from a flexible material and is flexible) having a probe with a sharp tip attached to an end thereof, such as cantilever 200, is provided; (2) the tip of the probe can pull a sample from the substrate by adsorbing (contacting and combining) with the sample; (3) the force working on the lever can be measured; and (4) the position of the lever can be precisely adjusted. The present invention can be basically utilized for an apparatus which extends the molecule in terms of the single-axis as found in an optical tweezers method or a method using a glass needle, as a single-molecule extending method.

In the explanation related to FIG. 7 to FIG. 9, an example of moving substrate 100 in the x, y and z directions by controlling and moving scanner 500 in the x, y and z directions was explained. However, the configuration for moving the substrate together with the x, y and z axes for fine adjustment of the position of cantilever 200 is by no means excluded. It is also possible to perform fine adjustment so that cantilever 200 assumes the position where molecule 900 peels off, by scanner 500 equipped with substrate 100. Further, it is also possible that scanner 500 moves cantilever 200 in the z-axis direction by controlling the movement in the x and y axes directions. In case of moving cantilever 200, it is moved by a control from computer 300 by using scanner 500 or providing another scanner. Also, in a case that cantilever 200 is made to move, it includes a case of moving cantilever 200 and a case of controlling a relative position between a peeling point of molecule 900 and cantilever 200 by moving the substrate while controlling scanner 500.

Although a case has been explained with reference to FIGS. 8 and 9 where the position of the probe is controlled using software, this control can be implemented using other mediums including electronic circuitry.

In addition, the processes of S13 to S18 in FIG. 9 can be implemented by a program (control executed by a control processing section). The program may be loaded to computer 300 and executed using a storage area under the control of a central processing unit (CPU). The above program may be stored in a recording medium.

The present application is based on Japanese Patent Application No. 2004-224573, filed on Jul. 30, 2004, the entire content of which is expressly incorporated by reference herein.

INDUSTRIAL APPLICABILITY

The molecule measuring apparatus and molecule measuring method according to the present invention provide high accuracy and are suitable for use in high resolution measuring methods for nano-measuring apparatus for polymeric materials, basic technologies in molecule operations, drift measurement for apparatus at nano-levels, and technologies required in measuring chain polymers at single molecule levels for a long time.

The invention claimed is:

1. A molecule measuring apparatus comprising:
a lifting section that lifts, in a single axis direction, an edge of a molecule to be measured existing on a substrate; and
a computer with operating instructions for controlling an extending direction of the molecule in the single axis direction to position a peeling point of the molecule and a position of the lifting section on a vertical line with respect to the substrate, said peeling point being a boundary between a part where the molecule contacts with the substrate and a part where the molecule is detached from the substrate by means of the lifting section.

2. The molecule measuring apparatus according to claim 1, wherein said control section controls the position of the lifting section while keeping a distance between the lifting section in a state of lifting the edge of the molecule and the substrate constant.

3. The molecule measuring apparatus according to claim 1, wherein the control section detects a position where an amount of deflection of the lifting section is smaller and moves the lifting section to the detected position.

4. The molecule measuring apparatus according to claim 3, wherein the control section repeats detecting the position where the amount of deflection is smaller and moves the lifting section to a position of a minimum amount of deflection.

5. The molecule measuring apparatus according to claim 1, wherein the lifting section comprises a cantilever.

6. The molecule measuring apparatus according to claim 1, wherein the lifting section comprises optical tweezers.

7. The molecule measuring apparatus according to claim 6, wherein the optical tweezers comprises light radiation pressure.

8. The molecule measuring apparatus according to claim 1, wherein the lifting section comprises a glass needle.

9. The molecule measuring apparatus according to claim 1, wherein the computer comprises a measurement judging section, a deflection amount storage section, a measurement point storage section and a probe control section.

10. The molecule measuring apparatus according to claim 1, wherein the computer comprises:
a measurement judging section which obtains a measurement corresponding to an amount of deflection and compares the obtained measurement with a stored value, and determines whether to move the probe in response to the comparison;
a deflection amount storage section which stores the measured amount of deflection;
a probe control section which controls movement of the probe from a given point to a measurement point; and
a measurement storage section which stores information concerning the measurement point.

11. A molecule measuring method comprising:
lifting an edge of a molecule to be measured existing on a substrate using a lifting section; and
controlling a peeling point of the molecule and a position of the lifting section to be positioned on a vertical line with respect to the substrate, said peeling point being a boundary between a part where the molecule contacts with the substrate and a part where the molecule is detached from the substrate by means of the lifting section.

12. A computer program product, comprising:
a computer-readable medium comprising:
a first instruction for causing a computer to control a cantilever to lift an edge of a molecule from a substrate;
a second instruction for causing the computer to measure an amount of deflection of the cantilever when lifting the molecule from the substrate;
a third instruction for causing the computer to control movement of the probe to a measurement point stored in a measurement point store;
a fourth instruction for causing the computer to obtain a measurement of deflection of the cantilever after moving the probe and to store the amount of deflection in a deflection amount store;
a fifth instruction for causing the computer to determine measurement status of a predetermined set of measurement points and in the case of incomplete measurement of the predetermined set of measurement points, loop back to causing the computer to control movement of the probe to another measurement point;
a sixth instruction for, in the case of completion of measurement of the predetermined set of measurements points, causing the computer to extract a minimum value from the measured amounts of deflection;
a seventh instruction for causing the computer to control movement of the probe to a position of the minimum value; and
an eighth instruction for causing the computer to determine whether the amount of deflection for each measurement point corresponds to a predetermined range,
wherein the movement of the probe lifts an edge of the molecule to be measured from the substrate,
and wherein the control of movement of the probe effects control of a peeling point of the molecule and a position of the probe as positioned on a vertical line with respect to the substrate, said peeling point providing a boundary between a part where the molecule contacts with the substrate and a location of detachment of the molecule from the substrate by means of the lifting section.

13. The computer program product of claim 12, further comprising:
a ninth instruction to, in the case of the deflection for each measurement not corresponding to the predetermined range, cause the computer to loop back to causing the computer to control movement of the probe to another measurement point.

* * * * *